US011825457B2

(12) United States Patent
Sakhnini et al.

(10) Patent No.: US 11,825,457 B2
(45) Date of Patent: Nov. 21, 2023

(54) DYNAMIC CORESET HANDLING FOR BWP SWITCHING

(71) Applicant: QUALCOMM Incorporated, San Diego, CA (US)

(72) Inventors: Iyab Issam Sakhnini, San Diego, CA (US); Qiang Wu, San Diego, CA (US); Jun Ma, San Diego, CA (US); Mehmet Izzet Gurelli, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/248,706

(22) Filed: Feb. 3, 2021

(65) Prior Publication Data

US 2021/0298020 A1  Sep. 23, 2021

Related U.S. Application Data

(60) Provisional application No. 62/991,334, filed on Mar. 18, 2020.

(51) Int. Cl.
*H04W 72/0453* (2023.01)
*H04W 24/08* (2009.01)
*H04L 5/00* (2006.01)
*H04W 72/23* (2023.01)

(52) U.S. Cl.
CPC ....... *H04W 72/0453* (2013.01); *H04L 5/0092* (2013.01); *H04W 24/08* (2013.01); *H04W 72/23* (2023.01)

(58) Field of Classification Search
CPC .................................................. H04W 72/0453
See application file for complete search history.

(56) References Cited

U.S. PATENT DOCUMENTS

| | | | | |
|---|---|---|---|---|
| 2020/0037260 A1* | 1/2020 | Fu | ........................ | H04W 52/146 |
| 2020/0205134 A1* | 6/2020 | Pan | ........................ | H04W 72/04 |
| 2021/0274535 A1* | 9/2021 | Yi | ........................ | H04W 76/27 |
| 2022/0038167 A1* | 2/2022 | Chen | ........................ | H04B 7/0695 |
| 2022/0166594 A1* | 5/2022 | Zhang | ........................ | H04W 72/21 |

FOREIGN PATENT DOCUMENTS

EP          3993476 A1 *  5/2022  ............ H04W 56/00

* cited by examiner

*Primary Examiner* — Abdeltif Ajid
(74) *Attorney, Agent, or Firm* — QUALCOMM Incorporated

(57) ABSTRACT

Various aspects of the present disclosure generally relate to wireless communication. In some aspects, a user equipment (UE) may receive a physical downlink control channel (PDCCH) communication in a first dynamic control resource set (CORESET) configured in a first bandwidth part (BWP). The PDCCH communication may indicate a BWP switch from the first BWP to a second BWP. The UE may determine, based at least in part on the BWP switch, whether to monitor one or more second dynamic CORESETs, subsequent to the first dynamic CORESET, that were configured in the first BWP. The UE may selectively monitor the one or more second dynamic CORESETs based at least in part on determining whether to monitor the one or more second dynamic CORESETs. Numerous other aspects are provided.

30 Claims, 10 Drawing Sheets

DYNAMIC CORESET HANDLING FOR BWP SWITCHING

CROSS-REFERENCE TO RELATED APPLICATION

This patent application claims priority to U.S. Provisional Patent Application No. 62/991,334, filed on Mar. 18, 2020, and entitled "DYNAMIC CORESET HANDLING FOR BWP SWITCHING." The disclosure of the prior APPLICATION is considered part of and is incorporated by reference into this patent application.

FIELD OF THE DISCLOSURE

Aspects of the present disclosure generally relate to wireless communication and to techniques and apparatuses for dynamic control resource set (CORESET) handling for bandwidth part (BWP) switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, and/or a 5G Node B, among other examples.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include receiving a physical downlink control channel (PDCCH) communication in a first dynamic control resource set (CORESET) configured in a first bandwidth part (BWP), wherein the PDCCH communication indicates a BWP switch from the first BWP to a second BWP; determining, based at least in part on the BWP switch, whether to monitor one or more second dynamic CORESETs, subsequent to the first dynamic CORESET, that were configured in the first BWP; and selectively monitoring the one or more second dynamic CORESETs based at least in part on determining whether to monitor the one or more second dynamic CORESETs.

In some aspects, a method of wireless communication, performed by a base station, may include transmitting, to a UE, a PDCCH communication in a first dynamic CORESET configured in a first BWP, wherein the PDCCH communication indicates a BWP switch from the first BWP to a second BWP; and transmitting, to the UE, an indication of whether to monitor one or more second dynamic CORESETs, subsequent to the first dynamic CORESET, that were configured in the first BWP.

In some aspects, a UE for wireless communication may include a memory and one or more processors operatively coupled to the memory. The memory and the one or more processors may be configured to receive a PDCCH communication in a first dynamic CORESET configured in a first BWP, wherein the PDCCH communication indicates a BWP switch from the first BWP to a second BWP; determine, based at least in part on the BWP switch, whether to monitor one or more second dynamic CORESETs, subsequent to the first dynamic CORESET, that were configured in the first BWP; and selectively monitor the one or more second dynamic CORESETs based at least in part on determining whether to monitor the one or more second dynamic CORESETs.

In some aspects, a BS for wireless communication may include a memory and one or more processors operatively coupled to the memory. The memory and the one or more processors may be configured to transmit, to a UE, a PDCCH communication in a first dynamic CORESET configured in a first BWP, wherein the PDCCH communication indicates a BWP switch from the first BWP to a second BWP; and transmit, to the UE, an indication of whether to monitor one or more second dynamic CORESETs, subsequent to the first dynamic CORESET, that were configured in the first BWP.

In some aspects, a non-transitory computer-readable medium may store one or more instructions for wireless communication. The one or more instructions, when executed by one or more processors of a BS, may cause the one or more processors to receive a PDCCH communication in a first dynamic CORESET configured in a first BWP, wherein the PDCCH communication indicates a BWP switch from the first BWP to a second BWP; determine, based at least in part on the BWP switch, whether to monitor one or more second dynamic CORESETs, subsequent to the first dynamic CORESET, that were configured in the first BWP; and selectively monitor the one or more second dynamic CORESETs based at least in part on determining whether to monitor the one or more second dynamic CORESETs.

In some aspects, a non-transitory computer-readable medium may store one or more instructions for wireless communication. The one or more instructions, when executed by one or more processors of a BS, may cause the one or more processors to transmit, to a UE, a PDCCH communication in a first dynamic CORESET configured in a first BWP, wherein the PDCCH communication indicates a BWP switch from the first BWP to a second BWP; and transmit, to the UE, an indication of whether to monitor one or more second dynamic CORESETs, subsequent to the first dynamic CORESET, that were configured in the first BWP.

In some aspects, an apparatus for wireless communication may include means for receiving a PDCCH communication in a first dynamic CORESET configured in a first BWP, wherein the PDCCH communication indicates a BWP switch from the first BWP to a second BWP; means for determining, based at least in part on the BWP switch, whether to monitor one or more second dynamic CORESETs, subsequent to the first dynamic CORESET, that were configured in the first BWP; and means for selectively monitoring the one or more second dynamic CORESETs based at least in part on determining whether to monitor the one or more second dynamic CORESETs.

In some aspects, an apparatus for wireless communication may include means for transmitting, to a UE, a PDCCH communication in a first dynamic CORESET configured in a first BWP, wherein the PDCCH communication indicates a BWP switch from the first BWP to a second BWP; and means for transmitting, to the UE, an indication of whether to monitor one or more second dynamic CORESETs, subsequent to the first dynamic CORESET, that were configured in the first BWP.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, and/or algorithms (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as Fifth Generation (5G) and later, including New Radio (NR) technologies.

Figure 1:
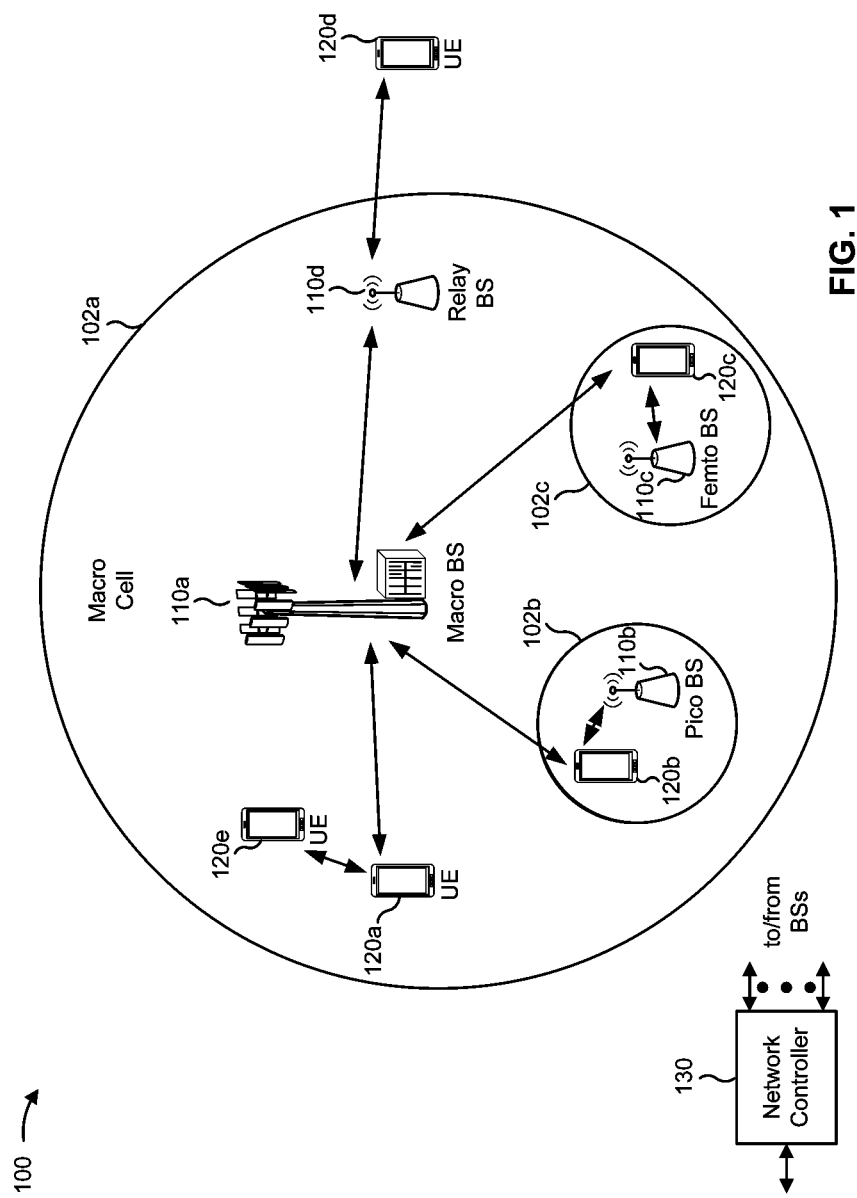
FIG. 1 is a diagram illustrating an example of a wireless network, in accordance with the present disclosure.

FIG. 1 is a diagram illustrating an example of a wireless network 100 in which aspects of the present disclosure may be practiced. The wireless network 100 may be a Long Term Evolution (LTE) network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, and/or a transmit receive point (TRP), among other examples. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or another type of backhaul interface using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

Wireless network 100 may be a heterogeneous network that includes BSs of different types, e.g., macro BSs, pico BSs, femto BSs, relay BSs, and/or other types of BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, for example, directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, or a station, among other examples. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
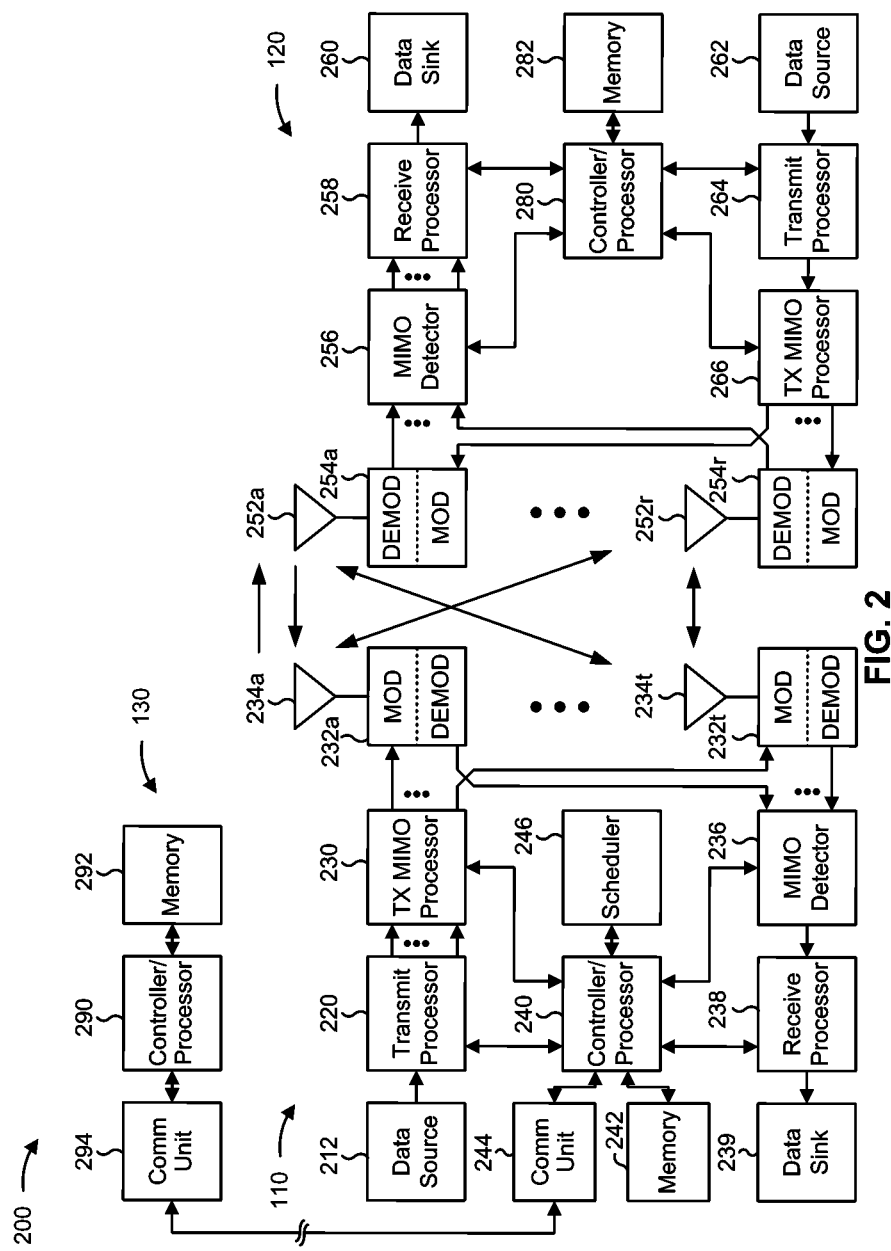
FIG. 2 is a diagram illustrating an example of a base station (BS) in communication with a user equipment (UE) in a wireless network, in accordance with the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., semi-static resource partitioning information (SRPI)) and control information (e.g., CQI requests, grants, and/or upper layer signaling, among other examples), and may provide overhead symbols and control symbols. Transmit processor 220 may also generate reference symbols for reference signals (e.g., a cell-specific reference signal (CRS), a demodulation reference signal (DMRS)) and synchronization signals (e.g., a primary synchronization signal (PSS) and/or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other parameters. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. In some aspects, a modulator and a demodulator (e.g., MOD/DEMOD 232) of the base station 110 may be included in a modem of the base station 110. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

Controller/processor 240 of base station 110, controller/processor 280 of UE 120, and/or any other component(s) of FIG. 2 may perform one or more techniques associated with dynamic control resource set (CORESET) handling for bandwidth part (BWP) switching, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving a physical downlink control channel (PDCCH) communication in a first CORESET configured in a BWP, wherein the PDCCH communication indicates a BWP switch from the first BWP to a second BWP, means for determining, based at least in part on the BWP switch, whether to monitor one or more second dynamic CORESETs, subsequent to the first dynamic CORESET, that were configured in the first BWP, means for selectively monitoring the one or more second dynamic CORESETs based at least in part on determining whether to monitor the one or more second dynamic CORESETs, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE 120, a PDCCH communication in a first dynamic CORESET configured in a first BWP, wherein the PDCCH communication indicates a BWP switch from the first BWP to a second BWP, means for transmitting, to the UE 120, an indication of whether to monitor one or more second dynamic CORESETs, subsequent to the first dynamic CORESET, that were configured in the first BWP, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

To meet the growing demands for expanded mobile broadband connectivity, wireless communication technologies are advancing from LTE technology to a next generation New Radio (NR) technology. For example, NR may operate over a wider bandwidth (BW) at higher frequencies than LTE, such as Third Generation Partnership Project (3GPP) Frequency Range 4 (FR4) and/or higher frequency bands (e.g., 52.6 gigahertz (GHz)-114.25 GHz). In addition, NR introduces the concept of BWPs, where a BS may dynamically configure a UE to communicate over a portion of a wireless network system bandwidth instead of over the entire wireless network system bandwidth. The use of BWPs can provide several benefits, such as reducing UE bandwidth capability and monitoring requirements, reducing power consumptions at UEs, reducing signaling overheads, and/or allowing for load balancing within a component carrier (CC).

In higher frequency bands, such as 3GPP FR4 and/or a 52.6 GHz-114.25 GHz frequency band, phase noise may pose a severe issue for wireless communication. To combat phase noise in FR4 and other higher frequency bands, the orthogonal frequency division multiplexing (OFDM) waveform used for wireless communication may be transmitted with very large subcarrier spacing, such as 960 kilohertz (kHz) to 3.84 megahertz (MHz). However, the use of very large subcarrier spacing may result in short slot lengths. As an example, the slot length for a 120 kHz spacing in 3GPP Frequency Range 2 (FR2) may be 125 μs, whereas the slot length for a 960 kHz subcarrier spacing in higher frequency bands may be 15.6 μs. In many cases, the processing capability of UEs may not be able to handle the short processing timelines for short slot lengths in 3GPP FR4 and/or a 52.6 GHz-114.25 GHz frequency band. As an example, a UE may not be able to obtain power saving benefits of short sleep cycles in higher frequency bands, even with same-slot scheduling, due to control channel processing of the UE occupying the entire slot or even overrunning the slot. As another example, if control channel processing of the UE is longer than one slot, the UE may not be capable of being configured to monitor for PDCCH communications in every slot.

A BS may sparsely configure a CORESET to alleviate some of the control channel processing constrains of UEs in 3GPP FR4 and/or a 52.6 GHz-114.25 GHz frequency band. In these cases, the CORESET for a UE (which may include time domain resources and/or frequency domain resources in which the UE is to monitor for PDCCH communications) is configured with fewer monitoring occasions or search space sets relative to 3GPP FR2 and/or other frequency bands. Accordingly, the UE is to monitor fewer resources in the CORESET for PDCCH communications, which accommodates the UE's control channel processing capabilities and permits the UE to obtain power saving benefits during sleep cycles when not monitoring. However, configuring a UE with fewer monitoring occasions or search space sets in a CORESET reduces flexibility in configuring the UE, and can cause an increase in latency because there are fewer opportunities to schedule uplink and/or downlink resources for the UE, fewer opportunities to change operating configurations of the UE, and/or the like.

To compromise between flexibility in configuring the UE and accommodating the UE's control channel processing capabilities through the use of sparse CORESET configuration, a BS may use dynamic CORESETs to dynamically schedule and/or configure the UE. In these cases, the BS may transmit PDCCH communications to the UE in a static (or semi-static) CORESET. The static CORESET may include a set of periodic and/or semi-persistent time domain resources and/or frequency domain resources. The BS may indicate, in a PDCCH communication transmitted in the static CORESET, time domain resources and/or frequency domain resources for one or more dynamic CORESETs. The BS may be capable of transmitting additional PDCCH communications in these dynamic CORESETs, which increases the flexibility in configuring the UE. Dynamic CORESETs can be located within the time domain resources and/or frequency domain resources of the static CORESET, can be located outside of the time domain resources and/or frequency domain resources of the static CORESET, or a combination thereof.

In some cases, the BS may include an indication of a BWP switch in a PDCCH communication transmitted in a dynamic CORESET. The BWP switch may indicate to the UE that the active BWP is being switched from a first BWP to a second BWP. However, there may be subsequent dynamic CORESETs (e.g., subsequent to the dynamic CORESET in which the indication of the BWP switch was received) configured for the UE, and the UE may be unable to determine whether to continue monitoring and processing these subsequent dynamic CORESETs in view of the BWP switch.

Some aspects described herein provide techniques and apparatuses for dynamic CORESET handling for BWP switching. A UE (e.g., UE 120) is capable of determining whether to monitor dynamic CORESETs, that were configured in the first BWP, subsequent to a dynamic CORESET in which an indication of a BWP switch between a first BWP and a second BWP is received. For example, the UE is capable of determining whether to monitor dynamic CORESETs that are configured to occur within the second BWP, that are configured to occur outside of the second BWP, that are configured to occur in a BWP switching gap between the first BWP and the second BWP, and/or the like. In some aspects, a BS (e.g., BS 110) is capable of transmitting downlink signaling to the UE for supporting the UE's determination of whether to monitor the dynamic CORESETs. In this way, the UE is capable of determining whether to continue monitoring and processing the subsequent dynamic CORESETs in view of the BWP switch, which can reduce processing, memory, and power consumption of the UE (e.g., if the UE determines to refrain from monitoring and processing the subsequent dynamic CORESETs), can reduce the quantity of dropped and/or retransmitted PDCCH communications (e.g., if the UE determines to monitor and process the subsequent dynamic CORESETs), and/or the like.

FIGS. 3A-3F are diagrams illustrating one or more examples 300 of dynamic CORESET handling for BWP switching, in accordance with the present disclosure. As shown in FIGS. 3A-3F, example(s) 300 may include communication between a BS 110 (e.g., BS 110 illustrated and described above in connection with one or more of FIGS. 1 and/or 2) and a UE 120 (e.g., UE 120 illustrated and described above in connection with one or more of FIGS. 1 and/or 2). The BS 110 and the UE 120 may be included in a wireless network, such as wireless network 100. The BS 110 and the UE 120 may communicate via a wireless access link, which may include a downlink and an uplink. In some aspects, the BS 110 and the UE 120 communicate on a higher frequency band such as a 3GPP FR4 frequency band, a 52.6 GHz-114.25 GHz frequency band, and/or the like.

Figure 3A:
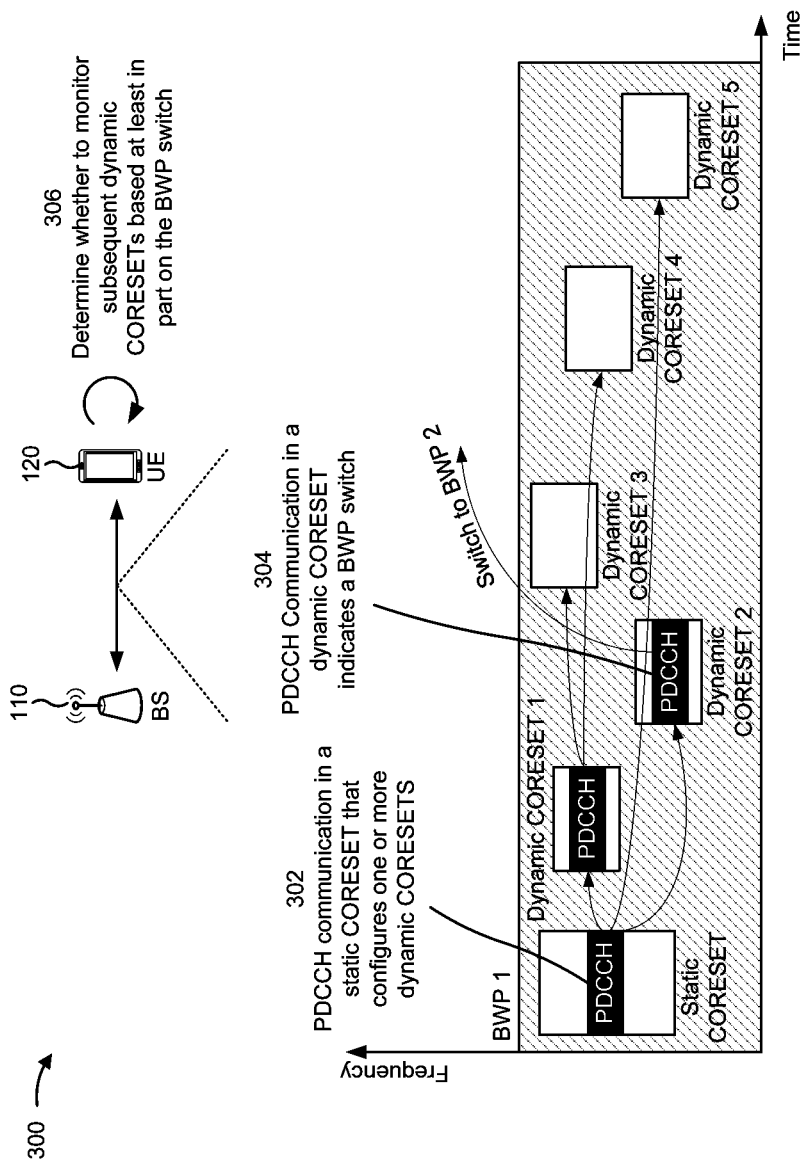
FIGS. 3A-3F are diagrams illustrating one or more examples of dynamic control resource set (CORESET) handling for bandwidth part (BWP) switching, in accordance with the present disclosure.

The BS 110 may configure one or more BWPs for the UE 120. As shown in FIG. 3A, the BS 110 may activate a BWP of the one or more BWPs for the UE 120 (e.g., BWP 1), and may transmit downlink communications to the UE 120 in the active BWP. For example, the BS 110 may transmit PDCCH communications to the UE 120 in the active BWP. The BS 110 may further configure a plurality of CORESETs for the UE 120 within the active BWP. The CORESETs may include a static CORESET and one or more dynamic CORESETs (e.g., dynamic CORESETs 1-5). The quantity of static CORESETs and dynamic CORESETs illustrated in FIGS. 3A-3F are examples, and different quantities of static CORESETs and/or dynamic CORESETs may be configured for the UE 120.

As further shown in FIG. 3A, and by reference number 302, the BS 110 may configure the one or more dynamic CORESETs by transmitting a PDCCH communication to the UE 120 in the static CORESET. The PDCCH communication may indicate the time domain resources and/or the frequency domain resources configured for the one or more dynamic CORESETs. In some aspects, a subset of the dynamic CORESETs may be configured by PDCCH communications transmitted in other dynamic CORESETs that are configured by the static CORESET. This may be referred to as dynamic CORESET chaining. As an example, and as further shown in FIG. 3A, the BS 110 transmits a PDCCH communication in dynamic CORESET 1 to configure dynamic CORESET 3 and dynamic CORESET 4.

The UE 120 may receive the PDCCH communication(s) transmitted from the BS 110 in the static CORESET and the dynamic CORESETs, may identify subsequent dynamic CORESETs based at least in part on the indication of the time domain resources and/or the frequency domain resources in the PDCCH communication(s), and may monitor these subsequent dynamic CORESETs in the indicated time domain resources and/or the frequency domain resources.

As further shown in FIG. 3A, and by reference number 304, the UE 120 may receive a PDCCH communication in a dynamic CORESET, and may determine that the PDCCH communication indicates a BWP switch for the UE 120. For example, the UE 120 may receive a PDCCH communication in dynamic CORESET 2, and may determine that the PDCCH communication indicates a switch from a first BWP of the UE 120 (e.g., the active BWP or BWP 1) to a second BWP (e.g., BWP 2).

As further shown in FIG. 3A, and by reference number 306, the UE 120 may determine whether to monitor subsequent dynamic CORESETs (e.g., subsequent to the dynamic CORESET in which the PDCCH communication indicating the BWP switch is received) based at least in part on the BWP switch. For example, the UE 120 may determine whether to monitor dynamic CORESETs 3-5 based at least in part on receiving the PDCCH communication indicating the BWP switch in dynamic CORESET 2.

The UE 120 may determine whether to monitor the subsequent dynamic CORESETs based at least in part on various parameters and/or factors, such as whether the subsequent dynamic CORESETs occur during a BWP switching gap between the first BWP and the second BWP (e.g., during the time that the UE 120 switches an antenna 252, a MOD or DEMOD 254, an RF chain and/or other components of the UE 120 from the first BWP to the second BWP), whether the subsequent dynamic CORESETs are configured to occur within or outside of the second BWP, and/or the like.

Figure 3B:
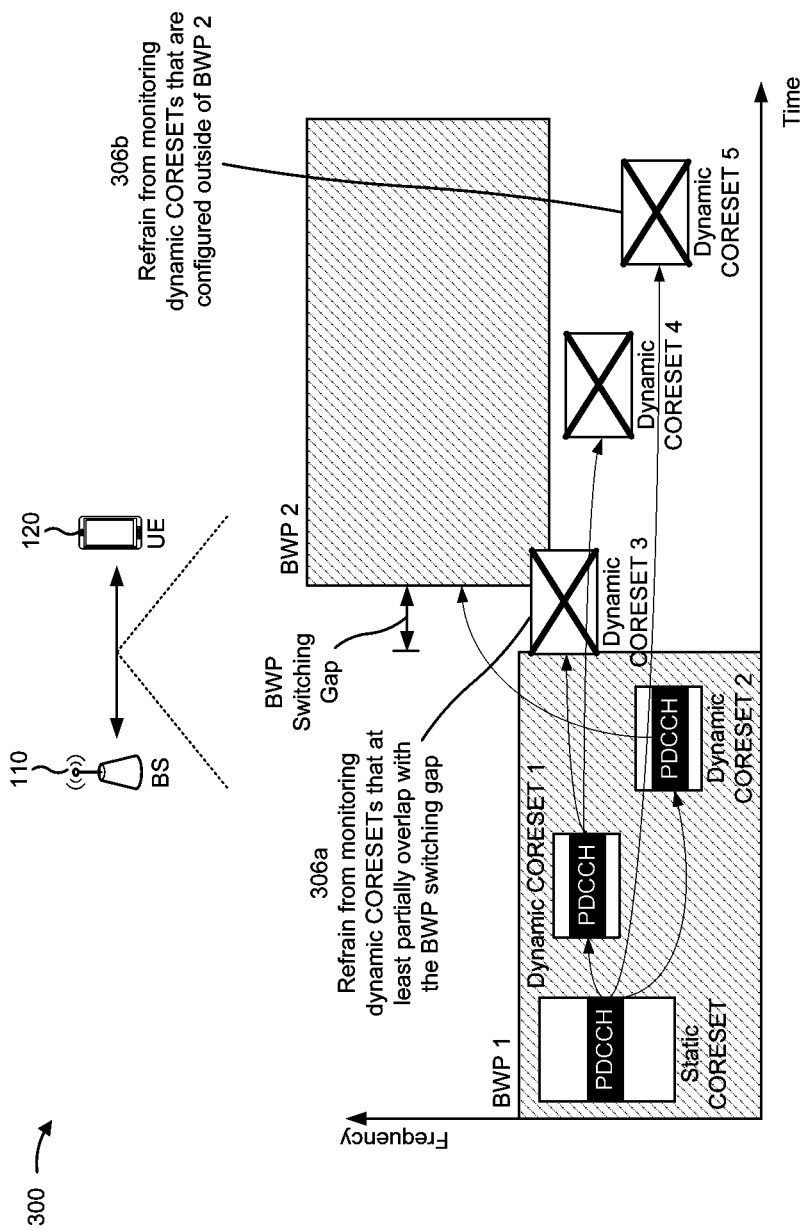

FIG. 3B and reference number 306a show an example in which the UE 120 determines to refrain from monitoring dynamic CORESETs (e.g., subsequent to the dynamic CORESET in which the PDCCH communication indicating the BWP switch is received) that at least partially overlap with the BWP switching gap of the UE 120. In these cases, the UE 120 may refrain from monitoring dynamic CORESETs that at least partially overlap with the BWP switching gap to perform the BWP switch. In these cases, the UE may refrain from monitoring the dynamic CORESETs based at least in part on the determination.

FIG. 3B and reference number 306b show an example in which the UE 120 determines to refrain from monitoring dynamic CORESETs (e.g., subsequent to the dynamic CORESET in which the PDCCH communication indicating the BWP switch is received) that are configured outside of the second BWP (e.g., that are configured outside of the time domain resources and/or the frequency domain resources configured for the second BWP). In these cases, the UE may refrain from monitoring the dynamic CORESETs based at least in part on the determination. In some aspects, the UE 120 determines to refrain from monitoring dynamic CORESETs that are not fully located in the second BWP (e.g., that only partially overlap with the time domain resources and/or the frequency domain resources configured for the second BWP).

Figure 3C:
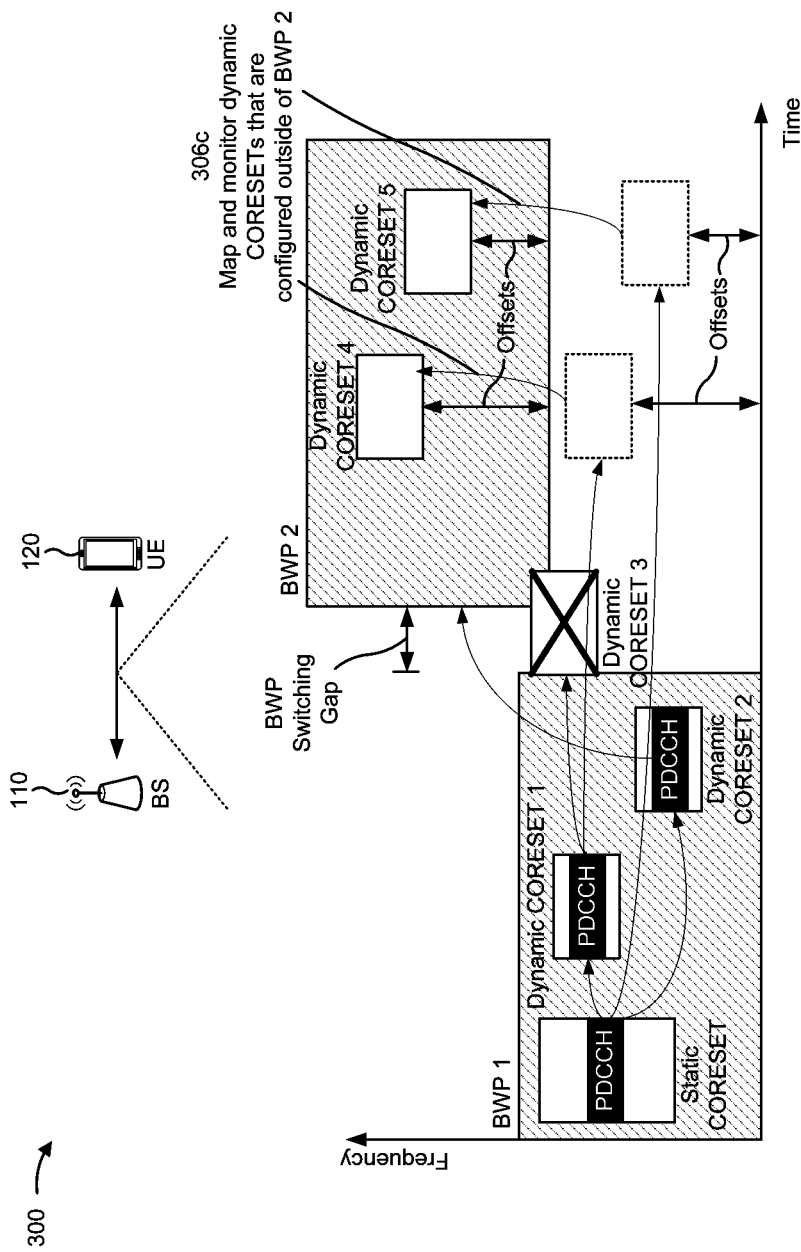

FIG. 3C and reference number 306c show an example in which the UE 120 determines to monitor dynamic CORESETs (e.g., subsequent to the dynamic CORESET in which the PDCCH communication indicating the BWP switch is received) that are configured outside of the second BWP (e.g., that are configured outside of the time domain resources and/or the frequency domain resources configured for the second BWP, that only partially overlap with the time domain resources and/or the frequency domain resources configured for the second BWP, and/or the like). In these cases, the UE 120 may map the dynamic CORESETs to the second BWP and monitor the dynamic CORESETs in the second BWP based at least in part on the determination.

The UE 120 may map the dynamic CORESETs to the second BWP based at least in part on one or more offsets for the dynamic CORESETs. The one or more offsets may include a frequency offset for a dynamic CORESET, a timing offset for a dynamic CORESET and/or the like. The frequency offset for a dynamic CORESET may include a particular quantity of resource blocks and/or resource elements from the lowest or starting resource block or resource element of the second BWP. In some aspects, the UE 120 may determine the frequency offset for a dynamic CORESET based at least in part on a frequency offset for the dynamic CORESET in the first BWP. In other words, if the dynamic CORESET is configured to start at a particular quantity of resource blocks from the starting resource block of the first BWP, the UE 120 may map the dynamic CORESET to start at the same quantity of resource blocks from the starting resource block of the second BWP. In these cases, the frequency offsets for the dynamic CORESETs may be variable. In some aspects, the UE 120 may determine the frequency offset for a dynamic CORESET as a fixed quantity of resource blocks for all dynamic CORESETs.

The timing offset for a dynamic CORESET may include a particular quantity of slots and/or symbols from the lowest or starting slot and/or symbol of the second BWP. In some aspects, the UE 120 may determine the timing offset for a dynamic CORESET based at least in part on a timing offset for the dynamic CORESET in the first BWP. In other words, if the dynamic CORESET is configured to start at a particular quantity of symbols from the starting resource block of the first BWP, the UE 120 may map the dynamic CORESET to start at the same quantity of symbols from the starting symbols of the second BWP. In these cases, the timing offsets for the dynamic CORESETs may be variable. In some aspects, the UE 120 may determine the timing offset for a dynamic CORESET as a fixed quantity of slots and/or symbols for all dynamic CORESETs.

Figure 3D:
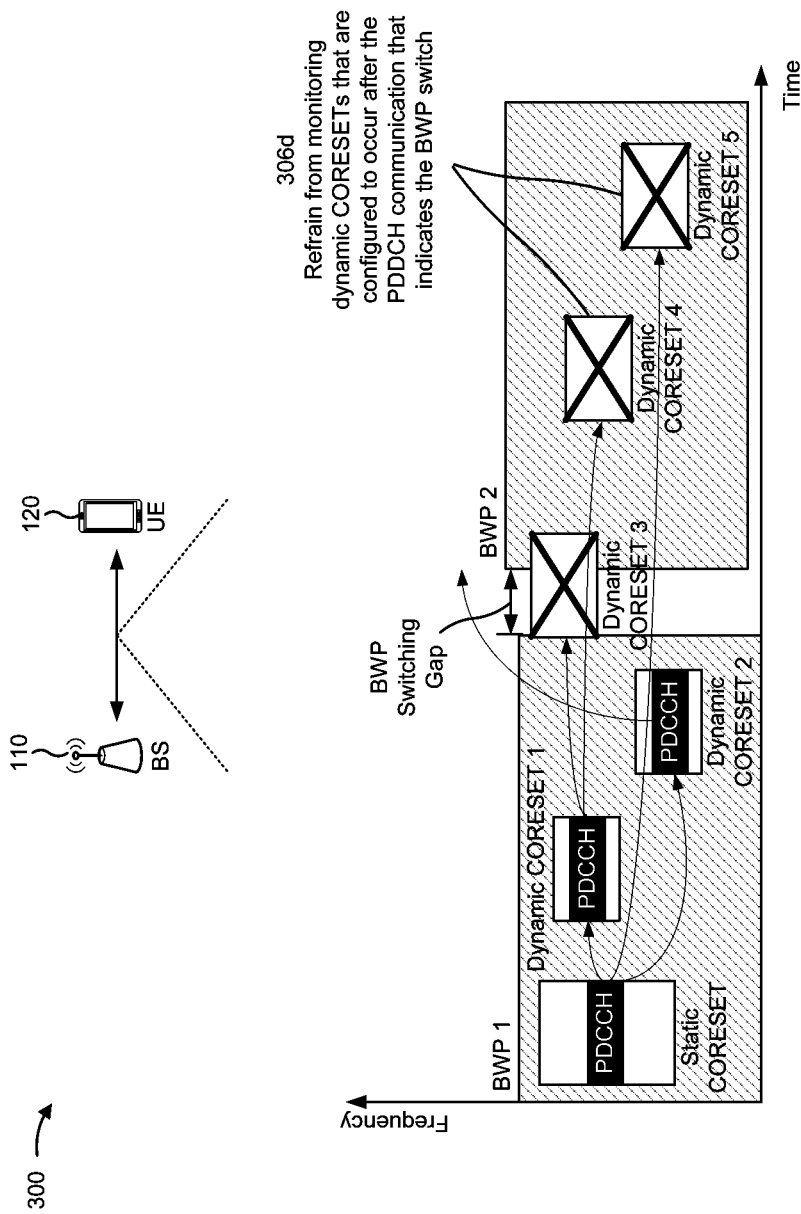

FIG. 3D and reference number 306d show an example in which the UE 120 determines to refrain from monitoring dynamic CORESETs that occur after or subsequent to the dynamic CORESET in which the PDCCH communication indicating the BWP switch is received. In these cases, the UE 120 determines to refrain from monitoring dynamic CORESETs regardless of whether the dynamic CORESETS are configured within or outside of the second BWP. The UE may refrain from monitoring the dynamic CORESETs based at least in part on the determination.

Figure 3E:
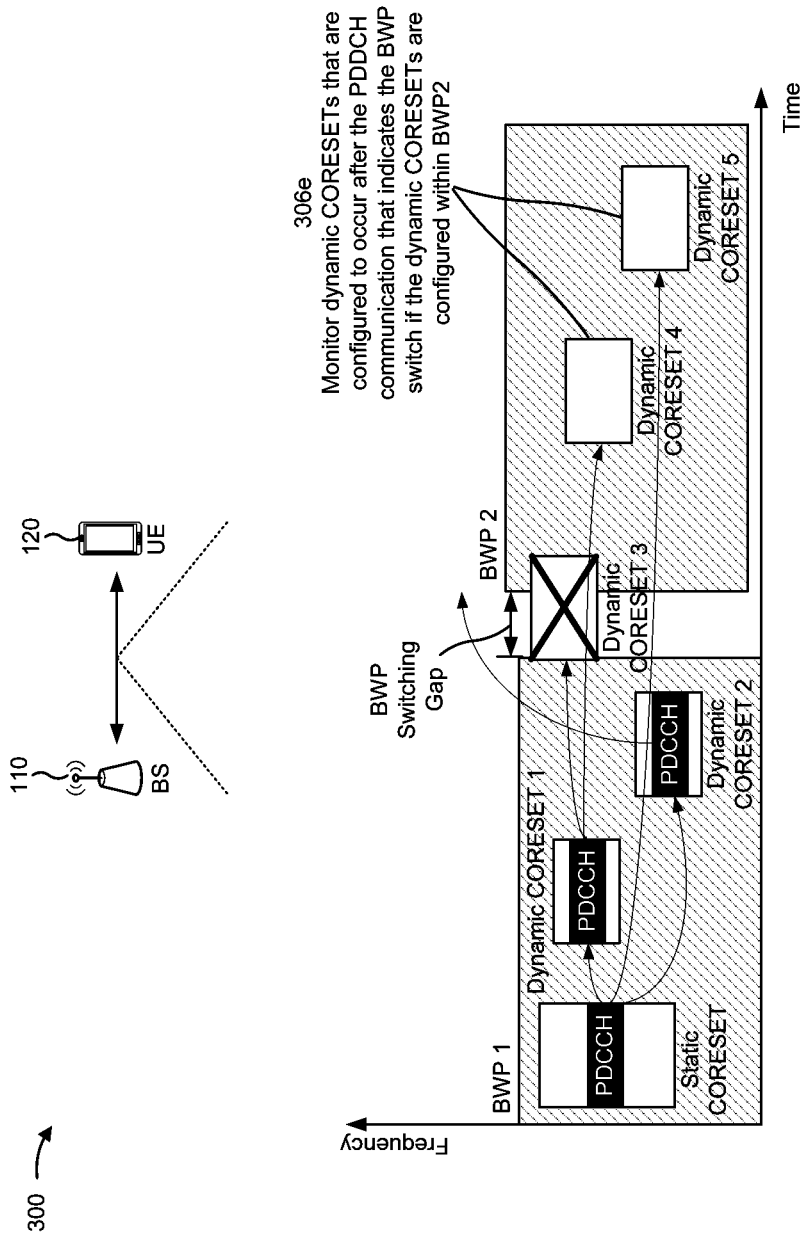

FIG. 3E and reference number 306e show an example in which the UE 120 determines to monitor dynamic CORESETs (e.g., subsequent to the dynamic CORESET in which the PDCCH communication indicating the BWP switch is received) that are configured within the second BWP (e.g., that are configured within the time domain resources and/or the frequency domain resources configured for the second BWP). In these cases, the UE may monitor the dynamic CORESETs in the second BWP based at least in part on the determination.

Figure 3F:
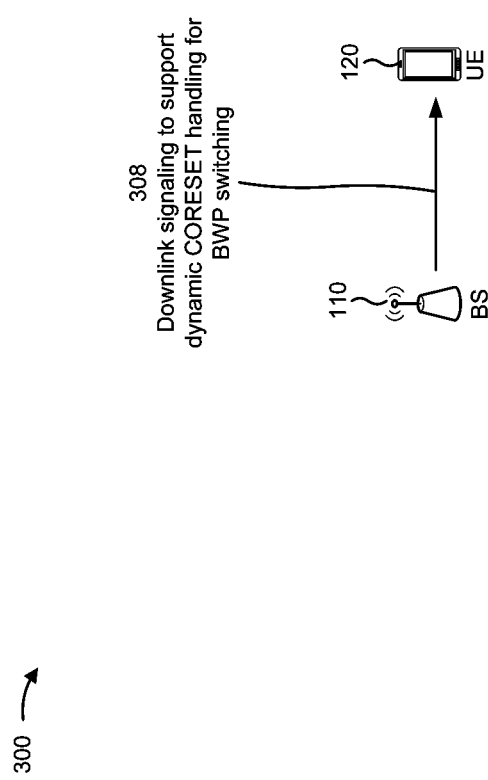

As shown in FIG. 3F, and by reference number 308, the BS 110 may transmit downlink signaling to the UE 120 to support dynamic CORESET handling for BWP switching at the UE 120. The downlink signaling may indicate, to the UE 120, whether to monitor dynamic CORESETs subsequent to a dynamic CORESET in which a PDCCH communication indicating a BWP switch between a first BWP and a second BWP is received. For example, the downlink signaling may indicate that the UE 120 is to refrain from monitoring dynamic CORESETs that at least partially overlap with the BWP switching gap between the first BWP and the second BWP. As another example, the downlink signaling may indicate that the UE 120 is to refrain from monitoring dynamic CORESETs that are configured outside of the second BWP. As another example, the downlink signaling may indicate that the UE 120 is to monitor dynamic CORESETs that are configured within the second BWP. As another example, the downlink signaling may indicate that the UE 120 is to refrain from monitoring dynamic CORESETs regardless of whether the dynamic CORESETs are configured within or outside of the second BWP.

In some aspects, the BS 110 may transmit the downlink signaling to the UE 120 in various downlink communications. For example, the BS 110 may transmit the downlink signaling to the UE 120 in a radio resource control (RRC) communication (e.g., an RRC configuration), in downlink control information (DCI) in a PDCCH communication (e.g., a PDCCH communication transmitted in a static CORESET, in DCI in a PDCCH communication transmitted in a dynamic CORESET, in DCI in the PDCCH communication in which the BWP switch is indicated, and/or the like), and/or the like. In some aspects, the downlink signaling may be included in a bit field of one or more bits included in a downlink communication. The value indicated by the bit field may indicate whether the UE 120 is to monitor the dynamic CORESETs subsequent to the dynamic CORESET in which the PDCCH communication indicating the BWP switch is received.

In this way, the UE 120 is capable of determining whether to monitor dynamic CORESETs, that were configured in the first BWP, subsequent to a dynamic CORESET in which an indication of a BWP switch between a first BWP and a second BWP is received. In particular, the UE 120 is capable of determining whether to monitor dynamic CORESETs that are configured to occur within the second BWP, that are configured to occur outside of the second BWP, that are configured to occur in a BWP switching gap between the first BWP and the second BWP, and/or the like. Moreover, the BS 110 is capable of transmitting downlink signaling to the UE 120 for supporting the UE 120's determination of whether to monitor the dynamic CORESETs. In this way, the UE 120 is capable of determining whether to continue monitoring and processing the subsequent dynamic CORESETs in view of the BWP switch, which can reduce processing, memory, and power consumption of the UE 120

(e.g., if the UE 120 determines to refrain from monitoring and processing the subsequent dynamic CORESETs), can reduce the quantity of dropped and/or retransmitted PDCCH communications (e.g., if the UE 120 determines to monitor and process the subsequent dynamic CORESETs), and/or the like.

As indicated above, FIGS. 3A-3F are provided as one or more examples. Other examples may differ from what is described with respect to FIGS. 3A-3F.

Figure 4:
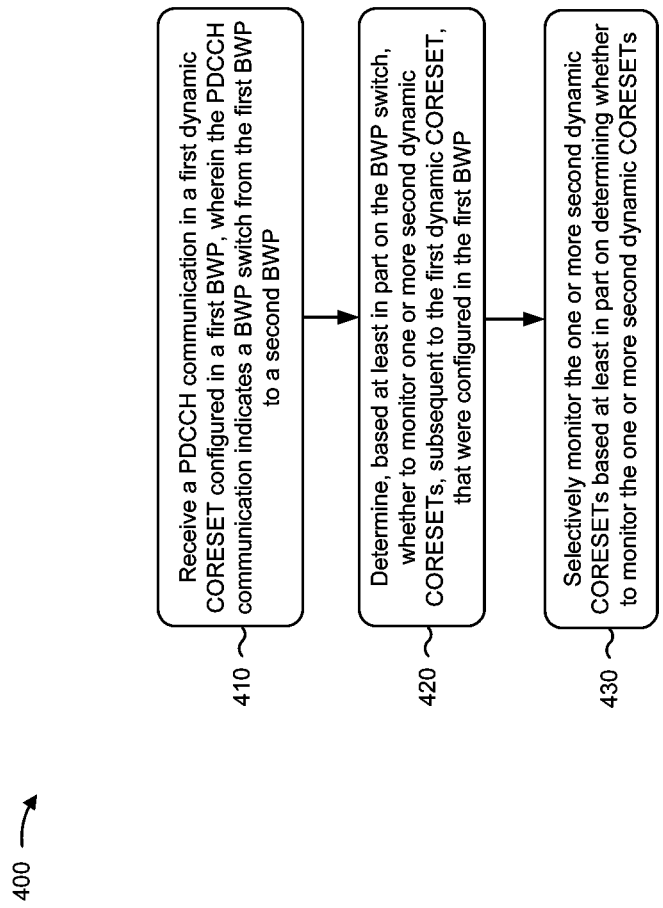
FIG. 4 is a diagram illustrating an example process performed, for example, by a UE, in accordance with the present disclosure.

FIG. 4 is a diagram illustrating an example process 400 performed, for example, by a UE, in accordance with the present disclosure. Example process 400 is an example where the UE (e.g., UE 120 illustrated and described above in connection with one or more of FIGS. 1, 2, and/or 3A-3F) performs operations associated with dynamic CORESET handling for BWP switching.

As shown in FIG. 4, in some aspects, process 400 may include receiving a PDCCH communication in a first dynamic CORESET configured in a first BWP, wherein the PDCCH communication indicates a BWP switch from the first BWP to a second BWP (block 410). For example, the UE (e.g., using receive processor 258, transmit processor 264, controller/processor 280, memory 282, and/or the like) may receive a PDCCH communication in a first dynamic CORESET configured in a first BWP, as described above. In some aspects, the PDCCH communication indicates a BWP switch from the first BWP to a second BWP.

As further shown in FIG. 4, in some aspects, process 400 may include determining, based at least in part on the BWP switch, whether to monitor one or more second dynamic CORESETs, subsequent to the first dynamic CORESET, that were configured in the first BWP (block 420). For example, the UE (e.g., using receive processor 258, transmit processor 264, controller/processor 280, memory 282, and/or the like) may determine, based at least in part on the BWP switch, whether to monitor one or more second dynamic CORESETs, subsequent to the first dynamic CORESET, that were configured in the first BWP, as described above.

As further shown in FIG. 4, in some aspects, process 400 may include selectively monitoring the one or more second dynamic CORESETs based at least in part on determining whether to monitor the one or more second dynamic CORESETs (block 430). For example, the UE (e.g., using receive processor 258, transmit processor 264, controller/processor 280, memory 282, and/or the like) may selectively monitor the one or more second dynamic CORESETs based at least in part on determining whether to monitor the one or more second dynamic CORESETs, as described above.

Process 400 may include additional aspects, such as any single aspect or any combination of aspects described below and/or in connection with one or more other processes described elsewhere herein.

In a first aspect, the one or more second dynamic CORESETs are configured outside of the second BWP; determining whether to monitor the one or more second dynamic CORESETs comprises determining, based at least in part on the one or more second dynamic CORESETs being configured outside of the second BWP, to refrain from monitoring the one or more second dynamic CORESETs, and selectively monitoring the one or more second dynamic CORESETS comprises refraining from monitoring the one or more second dynamic CORESETs based at least in part on determining to refrain from monitoring the one or more second dynamic CORESETs.

In a second aspect, alone or in combination with the first aspect, the one or more second dynamic CORESETs are configured outside of the second BWP; determining whether to monitor the one or more second dynamic CORESETs comprises determining, based at least in part on the one or more second dynamic CORESETs being configured outside of the second BWP, to monitor the one or more second dynamic CORESETs, and selectively monitoring the one or more second dynamic CORESETS comprises mapping the one or more second dynamic CORESETs to the second BWP based at least in part on determining to monitor the one or more second dynamic CORESETs, and monitoring the one or more second dynamic CORESETs in the second BWP.

In a third aspect, alone or in combination with one or more of the first and second aspects, mapping the one or more second dynamic CORESETs to the second BWP comprises mapping the one or more second dynamic CORESETs to the second BWP based at least in part on at least one of a frequency domain offset associated with the first BWP or a time domain offset associated with the first BWP.

In a fourth aspect, alone or in combination with one or more of the first through third aspects, the one or more second dynamic CORESETs are configured within the second BWP; determining whether to monitor the one or more second dynamic CORESETs comprises determining to refrain from monitoring the one or more second dynamic CORESETs, and selectively monitoring the one or more second dynamic CORESETS comprises refraining from monitoring the one or more second dynamic CORESETs based at least in part on determining to refrain from monitoring the one or more second dynamic CORESETs.

In a fifth aspect, alone or in combination with one or more of the first through fourth aspects, the one or more second dynamic CORESETs are configured within the second BWP; determining whether to monitor the one or more second dynamic CORESETs comprises determining, based at least in part on the one or more second dynamic CORESETs being configured within the second BWP, to monitor the one or more second dynamic CORESETs, and selectively monitoring the one or more second dynamic CORESETS comprises monitoring the one or more second dynamic CORESETs in the second BWP based at least in part on determining to monitor the one or more second dynamic CORESETs.

In a sixth aspect, alone or in combination with one or more of the first through fifth aspects, determining whether to monitor the one or more second dynamic CORESETs comprises determining whether to monitor the one or more second dynamic CORESETs based at least in part on a bit field included in at least one of: the PDCCH communication, another PDCCH communication, an RRC configuration.

In a seventh aspect, alone or in combination with one or more of the first through sixth aspects, the one or more second dynamic CORESETs at least partially overlap with a BWP switching gap between the first BWP and the second BWP; determining whether to monitor the one or more second dynamic CORESETs comprises determining to refrain from monitoring the one or more second dynamic CORESETs based at least in part on the one or more second dynamic CORESETs at least partially overlapping with the BWP switching gap, and selectively monitoring the one or more second dynamic CORESETS comprises refraining from monitoring the one or more second dynamic CORESETs based at least in part on determining to refrain from monitoring the one or more second dynamic CORESETs.

In an eighth aspect, alone or in combination with one or more of the first through seventh aspects, the one or more second dynamic CORESETs include at least one of a third dynamic CORESET configured by another PDCCH communication received in a static CORESET of the first BWP, a fourth dynamic CORESET configured by the PDCCH communication, or a fifth dynamic CORESET configured by another PDCCH communication received in a sixth dynamic CORESET.

In a ninth aspect, alone or in combination with one or more of the first through eighth aspects, the first BWP and the second BWP are configured in a high-frequency band. In a tenth aspect, alone or in combination with one or more of the first through ninth aspects, the first BWP and the second BWP are configured in a 3GPP FR4 frequency band.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
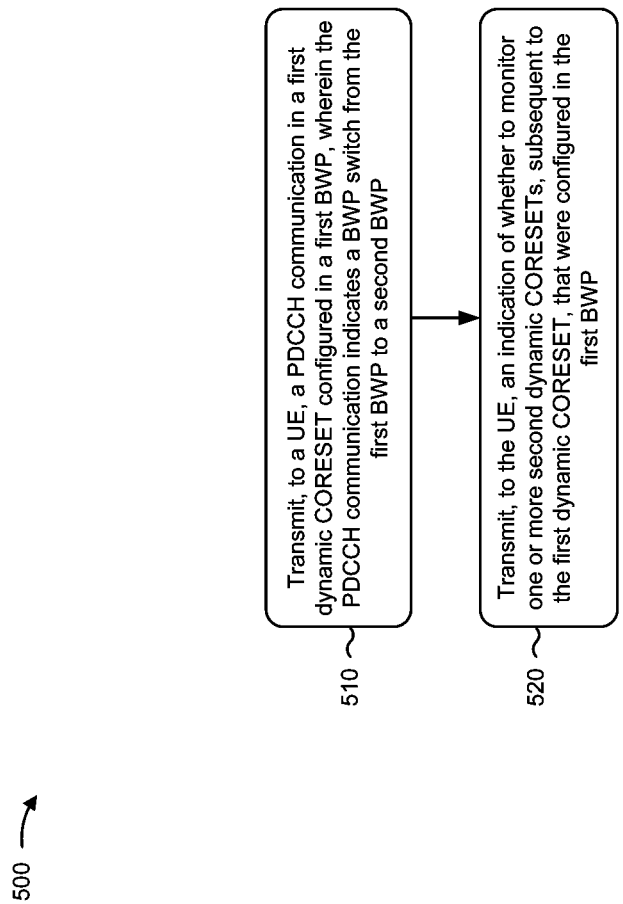
FIG. 5 is a diagram illustrating an example process performed, for example, by a BS, in accordance with the present disclosure.

FIG. 5 is a diagram illustrating an example process 500 performed, for example, by a BS, in accordance with the present disclosure. Example process 500 is an example where the BS (e.g., BS 110 illustrated and described above in connection with one or more of FIGS. 1, 2, and/or 3A-3F) performs operations associated with dynamic CORESET handling for BWP switching.

As shown in FIG. 5, in some aspects, process 500 may include transmitting, to a UE, a PDCCH communication in a first dynamic CORESET configured in a first BWP, wherein the PDCCH communication indicates a BWP switch from the first BWP to a second BWP (block 510). For example, the BS (e.g., using transmit processor 220, receive processor 238, controller/processor 240, memory 242, and/or the like) may transmit, to a UE, a PDCCH communication in a first dynamic CORESET configured in a first BWP, as described above. In some aspects, the PDCCH communication indicates a BWP switch from the first BWP to a second BWP.

As further shown in FIG. 5, in some aspects, process 500 may include transmitting, to the UE, an indication of whether to monitor one or more second dynamic CORESETs, subsequent to the first dynamic CORESET, that were configured in the first BWP (block 520). For example, the BS (e.g., using transmit processor 220, receive processor 238, controller/processor 240, memory 242, and/or the like) may transmit, to the UE, an indication of whether to monitor one or more second dynamic CORESETs, subsequent to the first dynamic CORESET, that were configured in the first BWP, as described above.

Process 500 may include additional aspects, such as any single aspect or any combination of aspects described below and/or in connection with one or more other processes described elsewhere herein.

In a first aspect, transmitting the indication of whether to monitor one or more second dynamic CORESETs comprises transmitting an indication to refrain from monitoring the one or more second dynamic CORESETs if the one or more second dynamic CORESETs are configured outside of the second BWP. In a second aspect, alone or in combination with the first aspect, transmitting the indication of whether to monitor one or more second dynamic CORESETs comprises transmitting an indication to: remap the one or more second dynamic CORESETs to the second BWP if the one or more second dynamic CORESETs are configured outside of the second BWP, and monitor the one or more second dynamic CORESETs in the second BWP.

In a third aspect, alone or in combination with one or more of the first and second aspects, transmitting the indication of whether to monitor the one or more second dynamic CORE-SETs comprises transmitting an indication to refrain from monitoring the one or more second dynamic CORESETs if the one or more second dynamic CORESETs are configured within the second BWP. In a fourth aspect, alone or in combination with one or more of the first through third aspects, transmitting the indication of whether to monitor the one or more second dynamic CORESETs comprises transmitting an indication to monitor the one or more second dynamic CORESETs if the one or more second dynamic CORESETs are configured within the second BWP.

In a fifth aspect, alone or in combination with one or more of the first through fourth aspects, transmitting the indication of whether to monitor the one or more second dynamic CORESETs comprises: transmitting the indication in a bit field included in at least one of: the PDCCH communication, another PDCCH communication, an RRC configuration. In a sixth aspect, alone or in combination with one or more of the first through fifth aspects, transmitting the indication of whether to monitor the one or more second dynamic CORE-SETs comprises transmitting an indication to refrain from monitoring the one or more second dynamic CORESETs if the one or more second dynamic CORESETs at least partially overlap with a BWP switching gap between the first BWP and the second BWP.

In a seventh aspect, alone or in combination with one or more of the first through sixth aspects, the one or more second dynamic CORESETs include at least one of a third dynamic CORESET configured by another PDCCH communication received in a static CORESET of the first BWP, a fourth dynamic CORESET configured by the PDCCH communication, or a fifth dynamic CORESET configured by another PDCCH communication received in a sixth dynamic CORESET. In an eighth aspect, alone or in combination with one or more of the first through seventh aspects, the first BWP and the second BWP are configured in a high-frequency band.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some aspects of the present disclosure:

Aspect 1: A method of wireless communication performed by a user equipment (UE), comprising: receiving a physical downlink control channel (PDCCH) communication in a first dynamic control resource set (CORESET) configured in a first bandwidth part (BWP), wherein the PDCCH communication indicates a BWP switch from the first BWP to a second BWP; determining, based at least in part on the BWP switch, whether to monitor one or more second dynamic CORESETs, subsequent to the first dynamic CORESET, that were configured in the first BWP; and selectively monitoring the one or more second dynamic CORESETs based at least in part on determining whether to monitor the one or more second dynamic CORESETs.

Aspect 2: The method of aspect 1, wherein the one or more second dynamic CORESETs are configured outside of the second BWP; wherein determining whether to monitor the one or more second dynamic CORESETs comprises: determining, based at least in part on the one or more second dynamic CORESETs being configured outside of the second BWP, to refrain from monitoring the one or more second dynamic CORESETs; and wherein selectively monitoring the one or more second dynamic CORESETS comprises: refraining from monitoring the one or more second dynamic CORESETs based at least in part on determining to refrain from monitoring the one or more second dynamic CORESETs. Aspect 3: The method of aspect 1 or 2, wherein the one or more second dynamic CORESETs are configured outside of the second BWP; wherein determining whether to monitor the one or more second dynamic CORESETs comprises: determining, based at least in part on the one or more second dynamic CORESETs being configured outside of the second BWP, to monitor the one or more second dynamic CORESETs; and wherein selectively monitoring the one or more second dynamic CORESETS comprises: mapping the one or more second dynamic CORESETs to the second BWP based at least in part on determining to monitor the one or more second dynamic CORESETs; and monitoring the one or more second dynamic CORESETs in the second BWP.

Aspect 4: The method of aspect 3, wherein mapping the one or more second dynamic CORESETs to the second BWP comprises: mapping the one or more second dynamic CORESETs to the second BWP based at least in part on at least one of: a frequency domain offset associated with the first BWP, or a time domain offset associated with the first BWP. Aspect 5: The method of any of aspects 1-4, wherein the one or more second dynamic CORESETs are configured within the second BWP; wherein determining whether to monitor the one or more second dynamic CORESETs comprises: determining to refrain from monitoring the one or more second dynamic CORESETs; and wherein selectively monitoring the one or more second dynamic CORESETS comprises: refraining from monitoring the one or more second dynamic CORESETs based at least in part on determining to refrain from monitoring the one or more second dynamic CORESETs.

Aspect 6: The method of any of aspects 1-5, wherein the one or more second dynamic CORESETs are configured within the second BWP; wherein determining whether to monitor the one or more second dynamic CORESETs comprises: determining, based at least in part on the one or more second dynamic CORESETs being configured within the second BWP, to monitor the one or more second dynamic CORESETs; and wherein selectively monitoring the one or more second dynamic CORESETS comprises: monitoring the one or more second dynamic CORESETs in the second BWP based at least in part on determining to monitor the one or more second dynamic CORESETs. Aspect 7: The method of any of aspects 1-6, wherein determining whether to monitor the one or more second dynamic CORESETs comprises: determining whether to monitor the one or more second dynamic CORESETs based at least in part on a bit field included in at least one of: the PDCCH communication, another PDCCH communication, a radio resource control (RRC) configuration.

Aspect 8: The method of any of aspects 1-7, wherein the one or more second dynamic CORESETs at least partially overlap with a BWP switching gap between the first BWP and the second BWP; wherein determining whether to monitor the one or more second dynamic CORESETs comprises: determining to refrain from monitoring the one or more second dynamic CORESETs based at least in part on the one or more second dynamic CORESETs at least partially overlapping with the BWP switching gap; and wherein selectively monitoring the one or more second dynamic CORESETS comprises: refraining from monitoring the one or more second dynamic CORESETs based at least in part on determining to refrain from monitoring the one or more second dynamic CORESETs. Aspect 9: The method of any of aspects 1-8, wherein the one or more second dynamic CORESETs include at least one of: a third dynamic CORESET configured by another PDCCH communication received in a static CORESET of the first BWP, a fourth dynamic CORESET configured by the PDCCH communication, or a fifth dynamic CORESET configured by another PDCCH communication received in a sixth dynamic CORESET.

Aspect 10: The method of any of aspects 1-9, wherein the first BWP and the second BWP are configured in a high-frequency band. Aspect 11: The method of aspect 1, wherein the first BWP and the second BWP are configured in a Third Generation Partnership Project (3GPP) Frequency Range 4 (FR4) frequency band.

Aspect 12: A method of wireless communication performed by a base station (BS), comprising: transmitting, to a user equipment (UE), a physical downlink control channel (PDCCH) communication in a first dynamic control resource set (CORESET) configured in a first bandwidth part (BWP), wherein the PDCCH communication indicates a BWP switch from the first BWP to a second BWP; and transmitting, to the UE, an indication of whether to monitor one or more second dynamic CORESETs, subsequent to the first dynamic CORESET, that were configured in the first BWP.

Aspect 13: The method of aspect 12, wherein transmitting the indication of whether to monitor the one or more second dynamic CORESETs comprises: transmitting an indication to refrain from monitoring the one or more second dynamic CORESETs if the one or more second dynamic CORESETs are configured outside of the second BWP. Aspect 14: The method of aspect 12 or 13, wherein transmitting the indication of whether to monitor the one or more second dynamic CORESETs comprises: transmitting an indication to: remap the one or more second dynamic CORESETs to the second BWP if the one or more second dynamic CORESETs are configured outside of the second BWP; and monitor the one or more second dynamic CORESETs in the second BWP.

Aspect 15: The method of any of aspects 12-14, wherein transmitting the indication of whether to monitor the one or more second dynamic CORESETs comprises: transmitting an indication to refrain from monitoring the one or more second dynamic CORESETs if the one or more second dynamic CORESETs are configured within the second BWP. Aspect 16: The method of any of aspects 12-15, wherein transmitting the indication of whether to monitor the one or more second dynamic CORESETs comprises: transmitting an indication to monitor the one or more second dynamic CORESETs if the one or more second dynamic CORESETs are configured within the second BWP.

Aspect 17: The method of any of aspects 12-16, wherein transmitting the indication of whether to monitor the one or more second dynamic CORESETs comprises: transmitting the indication in a bit field included in at least one of: the PDCCH communication, another PDCCH communication, a radio resource control (RRC) configuration. Aspect 18: The method of any of aspects 12-17, wherein transmitting the indication of whether to monitor the one or more second dynamic CORESETs comprises: transmitting an indication to refrain from monitoring the one or more second dynamic CORESETs if the one or more second dynamic CORESETs at least partially overlap with a BWP switching gap between the first BWP and the second BWP.

Aspect 19: The method of any of aspects 12-18, wherein the one or more second dynamic CORESETs include at least one of: a third dynamic CORESET configured by another PDCCH communication received in a static CORESET of the first BWP, a fourth dynamic CORESET configured by the PDCCH communication, or a fifth dynamic CORESET configured by another PDCCH communication received in a sixth dynamic CORESET. Aspect 20: The method of any of aspects 12-19, wherein the first BWP and the second BWP are configured in a high-frequency band.

Aspect 21: An apparatus for wireless communication at a device, comprising a processor; memory coupled with the processor; and instructions stored in the memory and executable by the processor to cause the apparatus to perform the method of one or more aspects of aspects 1-11. Aspect 22: A device for wireless communication, comprising a memory and one or more processors coupled to the memory, the memory and the one or more processors configured to perform the method of one or more aspects of aspects 1-11.

Aspect 23: An apparatus for wireless communication, comprising at least one means for performing the method of one or more aspects of aspects 1-11. Aspect 24: A non-transitory computer-readable medium storing code for wireless communication, the code comprising instructions executable by a processor to perform the method of one or more aspects of aspects 1-11. Aspect 25: A non-transitory computer-readable medium storing a set of instructions for wireless communication, the set of instructions comprising one or more instructions that, when executed by one or more processors of a device, cause the device to perform the method of one or more aspects of aspects 1-11.

Aspect 26: An apparatus for wireless communication at a device, comprising a processor; memory coupled with the processor; and instructions stored in the memory and executable by the processor to cause the apparatus to perform the method of one or more aspects of aspects 12-20. Aspect 27: A device for wireless communication, comprising a memory and one or more processors coupled to the memory, the memory and the one or more processors configured to perform the method of one or more aspects of aspects 12-20.

Aspect 28: An apparatus for wireless communication, comprising at least one means for performing the method of one or more aspects of aspects 12-20. Aspect 29: A non-transitory computer-readable medium storing code for wireless communication, the code comprising instructions executable by a processor to perform the method of one or more aspects of aspects 12-20. Aspect 30: A non-transitory computer-readable medium storing a set of instructions for wireless communication, the set of instructions comprising one or more instructions that, when executed by one or more processors of a device, cause the device to perform the method of one or more aspects of aspects 12-20.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user equipment (UE) for wireless communication, comprising:
  one or more memories; and
  one or more processors coupled to the one or more memories, the one or more processors configured to:
    receive a physical downlink control channel (PDCCH) communication in a first dynamic control resource set (CORESET), wherein the first dynamic CORESET is configured in a first bandwidth part (BWP), wherein the PDCCH communication indicates a BWP switch from the first BWP to a second BWP;
    determine, based at least in part on the BWP switch, whether to monitor one or more second dynamic CORESETs, wherein determining whether to monitor the one or more second dynamic CORESETs comprises determining whether to map the one or more second dynamic CORESETs from the first BWP into the second BWP, wherein the one or more second dynamic CORESETS were configured in the first BWP; and
    selectively monitor the one or more second dynamic CORESETs based at least in part on determining whether to monitor the one or more second dynamic CORESETs.

2. The UE of claim 1, wherein the one or more second dynamic CORESETs are configured outside of the second BWP;

wherein the memory and the one or more processors, when determining whether to monitor the one or more second dynamic CORESETs, are configured to:
determine, based at least in part on the one or more second dynamic CORESETs being configured outside of the second BWP, to refrain from monitoring the one or more second dynamic CORESETs; and
wherein the memory and the one or more processors, when selectively monitoring the one or more second dynamic CORESETS, are configured to:
refrain from monitoring the one or more second dynamic CORESETs based at least in part on determining to refrain from monitoring the one or more second dynamic CORESETs.

3. The UE of claim 1, wherein the one or more second dynamic CORESETs are configured outside of the second BWP;
wherein the memory and the one or more processors, when determining whether to monitor the one or more second dynamic CORESETs, are configured to:
determine, based at least in part on the one or more second dynamic CORESETs being configured outside of the second BWP, to monitor the one or more second dynamic CORESETs; and
wherein the memory and the one or more processors, when determining whether to map the one or more second dynamic CORESETS, are configured to:
map the one or more second dynamic CORESETs to the second BWP based at least in part on determining to monitor the one or more second dynamic CORESETs; and
wherein the memory and the one or more processors, when selectively monitoring the one or more second dynamic CORESETS, are configured to: monitor the one or more second dynamic CORESETs in the second BWP.

4. The UE of claim 3, wherein the memory and the one or more processors, when mapping the one or more second dynamic CORESETs to the second BWP, are configured to:
map the one or more second dynamic CORESETs to the second BWP based at least in part on at least one of:
a frequency domain offset associated with the first BWP, or
a time domain offset associated with the first BWP.

5. The UE of claim 1, wherein the one or more second dynamic CORESETs are configured within the second BWP;
wherein the memory and the one or more processors, when determining whether to monitor the one or more second dynamic CORESETs, are configured to:
determine to refrain from monitoring the one or more second dynamic CORESETs; and
wherein the memory and the one or more processors, when selectively monitoring the one or more second dynamic CORESETS, are configured to:
refrain from monitoring the one or more second dynamic CORESETs based at least in part on determining to refrain from monitoring the one or more second dynamic CORESETs.

6. The UE of claim 1, wherein the one or more second dynamic CORESETs are configured within the second BWP;
wherein the memory and the one or more processors, when determining whether to monitor the one or more second dynamic CORESETs, are configured to:
determine, based at least in part on the one or more second dynamic CORESETs being configured within the second BWP, to monitor the one or more second dynamic CORESETs; and
wherein the memory and the one or more processors, when selectively monitoring the one or more second dynamic CORESETS, are configured to:
monitor the one or more second dynamic CORESETs in the second BWP based at least in part on determining to monitor the one or more second dynamic CORESETs.

7. The UE of claim 1, wherein the memory and the one or more processors, when determining whether to monitor the one or more second dynamic CORESETs, are configured to:
determine whether to monitor the one or more second dynamic CORESETs based at least in part on a bit field included in at least one of:
the PDCCH communication,
another PDCCH communication,
a radio resource control (RRC) configuration.

8. The UE of claim 1, wherein the one or more second dynamic CORESETs at least partially overlap with a BWP switching gap between the first BWP and the second BWP;
wherein the memory and the one or more processors, when determining whether to monitor the one or more second dynamic CORESETs, are configured to:
determine to refrain from monitoring the one or more second dynamic CORESETs based at least in part on the one or more second dynamic CORESETs at least partially overlapping with the BWP switching gap; and
wherein the memory and the one or more processors, when selectively monitoring the one or more second dynamic CORESETS, are configured to:
refrain from monitoring the one or more second dynamic CORESETs based at least in part on determining to refrain from monitoring the one or more second dynamic CORESETs.

9. The UE of claim 1, wherein the one or more second dynamic CORESETs include at least one of:
a third dynamic CORESET configured by another PDCCH communication received in a static CORESET of the first BWP,
a fourth dynamic CORESET configured by the PDCCH communication, or
a fifth dynamic CORESET configured by another PDCCH communication received in a sixth dynamic CORESET.

10. The UE of claim 1, wherein the first BWP and the second BWP are configured in a high-frequency band.

11. The UE of claim 1, wherein the first BWP and the second BWP are configured in a Third Generation Partnership Project (3GPP) Frequency Range 4 (FR4) frequency band.

12. A network entity for wireless communication, comprising:
one or more memories; and
one or more processors coupled to the one or more memories, the one or more processors configured to:
transmit, to a user equipment (UE), a physical downlink control channel (PDCCH) communication in a first dynamic control resource set (CORESET), wherein the first dynamic CORESET is configured in a first bandwidth part (BWP),
wherein the PDCCH communication indicates a BWP switch from the first BWP to a second BWP; and
transmit, to the UE, an indication of whether to monitor one or more second dynamic CORESETs, wherein determining whether to monitor the one or more second dynamic CORESETs comprises determining whether to map the one or more second dynamic CORESETs from the first BWP into the second BWP, wherein the one or more second dynamic CORESETs were configured in the first BWP.

13. The network entity of claim 12, wherein the memory and the one or more processors, when transmitting the indication of whether to monitor the one or more second dynamic CORESETs, are configured to:
   transmit an indication to refrain from monitoring the one or more second dynamic CORESETs if the one or more second dynamic CORESETs are configured outside of the second BWP.

14. The network entity of claim 12, wherein the memory and the one or more processors, when transmitting the indication of whether to monitor the one or more second dynamic CORESETs, are configured to:
   transmit an indication to:
      remap the one or more second dynamic CORESETs to the second BWP if the one or more second dynamic CORESETs are configured outside of the second BWP; and
      monitor the one or more second dynamic CORESETs in the second BWP.

15. The network entity of claim 12, wherein the memory and the one or more processors, when transmitting the indication of whether to monitor the one or more second dynamic CORESETs, are configured to:
   transmit an indication to refrain from monitoring the one or more second dynamic CORESETs if the one or more second dynamic CORESETs are configured within the second BWP.

16. The network entity of claim 12, wherein the memory and the one or more processors, when transmitting the indication of whether to monitor the one or more second dynamic CORESETs, are configured to:
   transmit an indication to monitor the one or more second dynamic CORESETs if the one or more second dynamic CORESETs are configured within the second BWP.

17. The network entity of claim 12, wherein the memory and the one or more processors, when transmitting the indication of whether to monitor the one or more second dynamic CORESETs, are configured to:
   transmit the indication in a bit field included in at least one of:
      the PDCCH communication,
      another PDCCH communication,
      a radio resource control (RRC) configuration.

18. The network entity of claim 12, wherein the memory and the one or more processors, when transmitting the indication of whether to monitor the one or more second dynamic CORESETs, are configured to:
   transmit an indication to refrain from monitoring the one or more second dynamic CORESETs if the one or more second dynamic CORESETs at least partially overlap with a BWP switching gap between the first BWP and the second BWP.

19. The network entity of claim 12, wherein the one or more second dynamic CORESETs include at least one of:
   a third dynamic CORESET configured by another PDCCH communication received in a static CORESET of the first BWP,
   a fourth dynamic CORESET configured by the PDCCH communication, or
   a fifth dynamic CORESET configured by another PDCCH communication received in a sixth dynamic CORESET.

20. The network entity of claim 12, wherein the first BWP and the second BWP are configured in a high-frequency band.

21. A method of wireless communication performed by a user equipment (UE), comprising:
   receiving a physical downlink control channel (PDCCH) communication in a first dynamic control resource set (CORESET), wherein the first dynamic CORESET is configured in a first bandwidth part (BWP),
      wherein the PDCCH communication indicates a BWP switch from the first BWP to a second BWP;
   determining, based at least in part on the BWP switch, whether to monitor one or more second dynamic CORESETs, wherein determining whether to monitor the one or more second dynamic CORESETs comprises determining whether to map the one or more second dynamic CORESETs from the first BWP into the second BWP, wherein the one or more second dynamic CORESETs were configured in the first BWP; and
   selectively monitoring the one or more second dynamic CORESETs based at least in part on determining whether to monitor the one or more second dynamic CORESETs.

22. The method of claim 21, wherein the one or more second dynamic CORESETs are configured outside of the second BWP;
   wherein determining whether to monitor the one or more second dynamic CORESETs comprises:
      determining, based at least in part on the one or more second dynamic CORESETs being configured outside of the second BWP, to refrain from monitoring the one or more second dynamic CORESETs; and
   wherein selectively monitoring the one or more second dynamic CORESETS comprises:
      refraining from monitoring the one or more second dynamic CORESETs based at least in part on determining to refrain from monitoring the one or more second dynamic CORESETs.

23. The method of claim 21, wherein the one or more second dynamic CORESETs are configured outside of the second BWP;
   wherein determining whether to monitor the one or more second dynamic CORESETs comprises:
      determining, based at least in part on the one or more second dynamic CORESETs being configured outside of the second BWP, to monitor the one or more second dynamic CORESETs; and
   wherein determining whether to map the one or more second dynamic CORESETS comprises:
      mapping the one or more second dynamic CORESETs to the second BWP based at least in part on determining to monitor the one or more second dynamic CORESETs; and
      monitoring the one or more second dynamic CORESETs in the second BWP.

24. The method of claim 23, wherein mapping the one or more second dynamic CORESETs to the second BWP comprises:
   mapping the one or more second dynamic CORESETs to the second BWP based at least in part on at least one of:
      a frequency domain offset associated with the first BWP, or
      a time domain offset associated with the first BWP.

25. The method of claim 21, wherein the one or more second dynamic CORESETs are configured within the second BWP;
   wherein determining whether to monitor the one or more second dynamic CORESETs comprises:
      determining to refrain from monitoring the one or more second dynamic CORESETs; and
   wherein selectively monitoring the one or more second dynamic CORESETS comprises:
      refraining from monitoring the one or more second dynamic CORESETs based at least in part on determining to refrain from monitoring the one or more second dynamic CORESETs.

26. A method of wireless communication performed by a network entity, comprising:
   transmitting, to a user equipment (UE), a physical downlink control channel (PDCCH) communication in a first dynamic control resource set (CORESET), wherein the first dynamic CORESET is configured in a first bandwidth part (BWP),
      wherein the PDCCH communication indicates a BWP switch from the first BWP to a second BWP; and
   transmitting, to the UE, an indication of whether to monitor one or more second dynamic CORESETs, wherein determining whether to monitor the one or more second dynamic CORESETs comprises determining whether to map the one or more second dynamic CORESETs from the first BWP into the second BWP, wherein the one or more second dynamic CORESETs were configured in the first BWP.

27. The method of claim 26, wherein transmitting the indication of whether to monitor the one or more second dynamic CORESETs comprises:
   transmitting an indication to refrain from monitoring the one or more second dynamic CORESETs if the one or more second dynamic CORESETs are configured outside of the second BWP.

28. The method of claim 26, wherein transmitting the indication of whether to monitor the one or more second dynamic CORESETs comprises:
   transmitting an indication to:
      remap the one or more second dynamic CORESETs to the second BWP if the one or more second dynamic CORESETs are configured outside of the second BWP; and
      monitor the one or more second dynamic CORESETs in the second BWP.

29. The method of claim 26, wherein transmitting the indication of whether to monitor the one or more second dynamic CORESETs comprises:
   transmitting an indication to refrain from monitoring the one or more second dynamic CORESETs if the one or more second dynamic CORESETs are configured within the second BWP.

30. The method of claim 26, wherein transmitting the indication of whether to monitor the one or more second dynamic CORESETs comprises:
   transmitting an indication to monitor the one or more second dynamic CORESETs if the one or more second dynamic CORESETs are configured within the second BWP.

* * * * *